March 20, 1951 R. G. F. LOEWY 2,545,523
PASSENGER VEHICLE

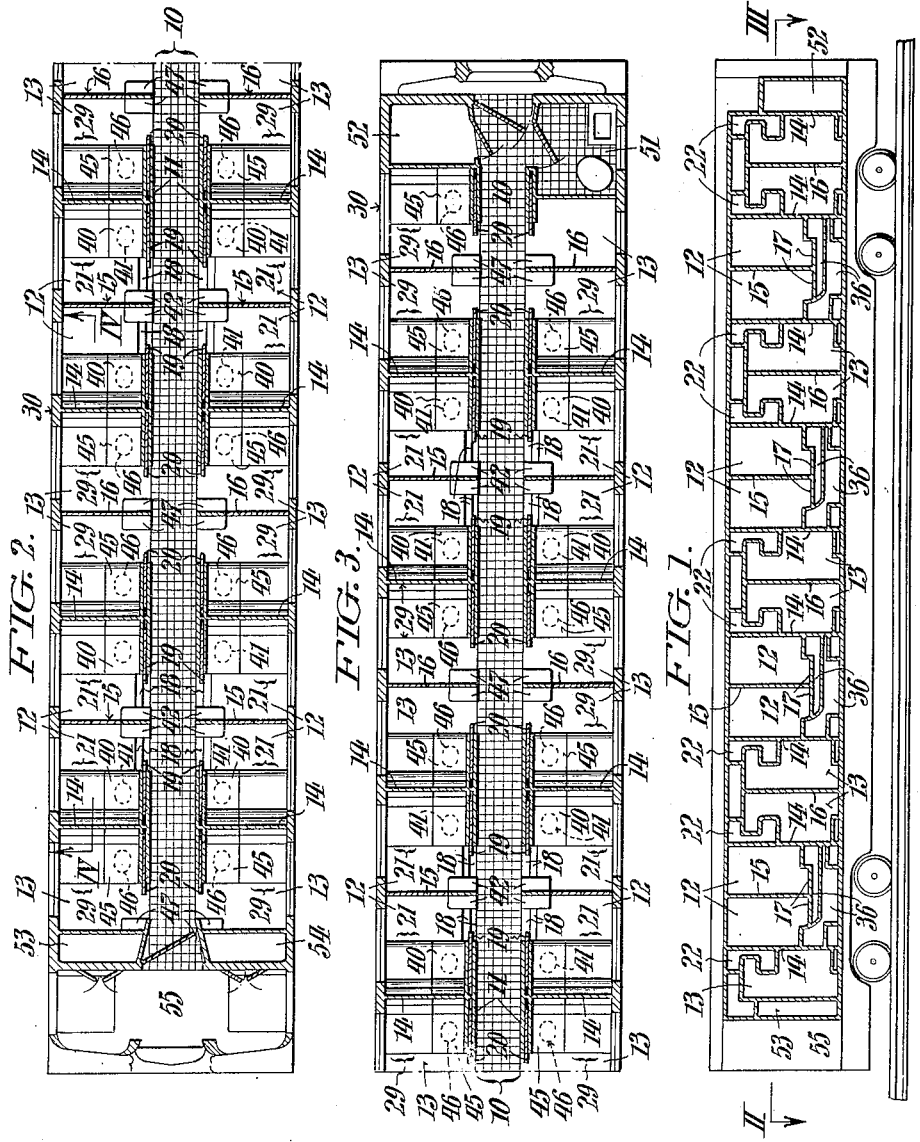

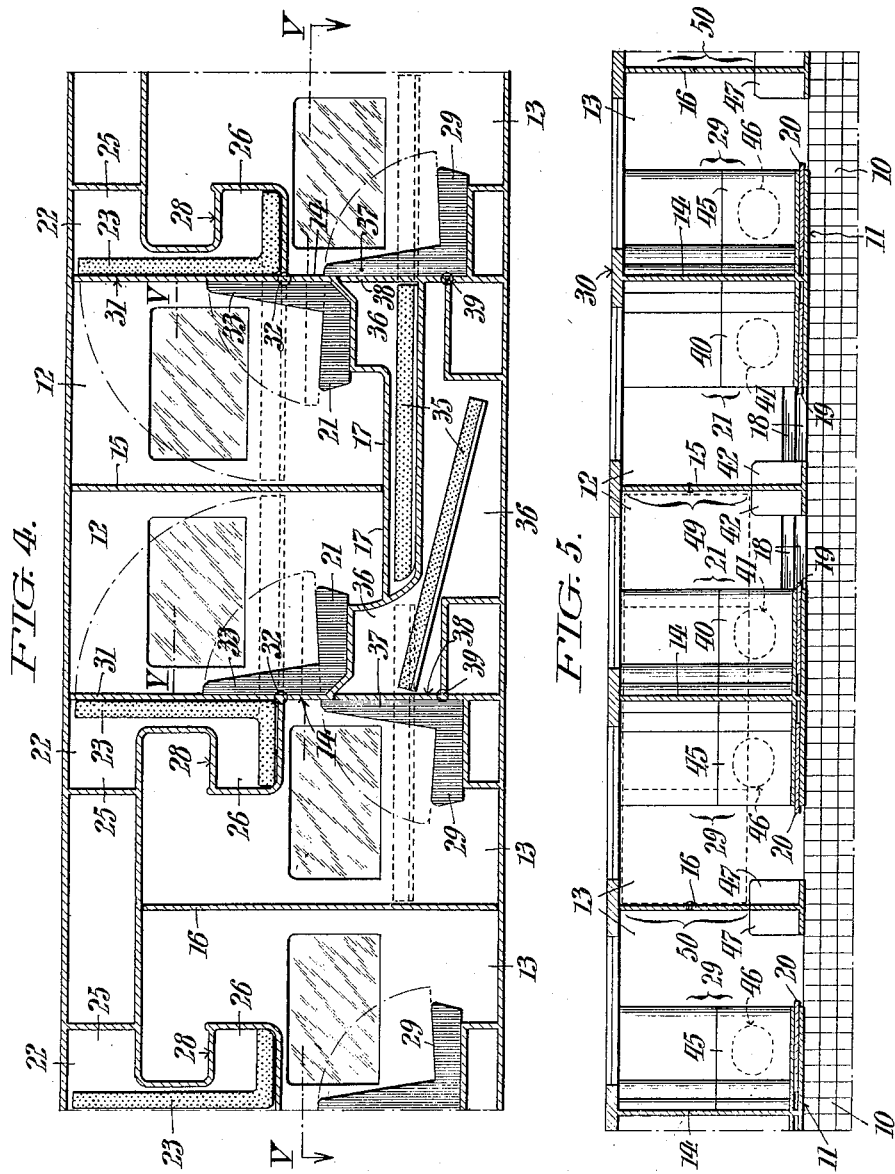

Filed Sept. 28, 1946 5 Sheets-Sheet 3

WITNESSES
Hubert Fuchs
George L. Comby

INVENTOR:
Raymond G. F. Loewy,
BY Paul Paul
ATTORNEYS.

March 20, 1951 R. G. F. LOEWY 2,545,523
PASSENGER VEHICLE
Filed Sept. 28, 1946 5 Sheets-Sheet 4

WITNESSES
Hubert Fuchs
George L. Comly

INVENTOR:
Raymond G.F. Loewy,
BY Paul & Paul
ATTORNEYS.

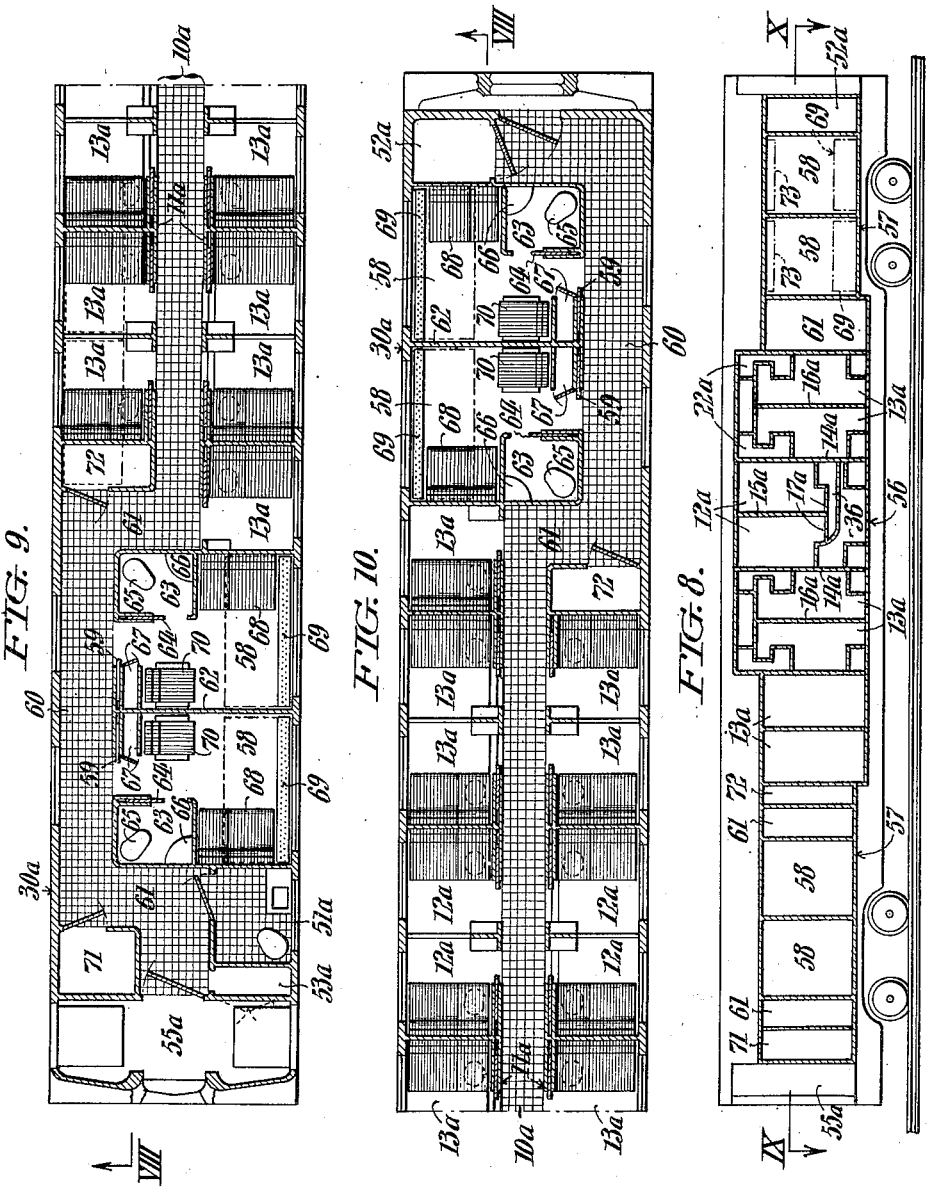

Patented Mar. 20, 1951

2,545,523

UNITED STATES PATENT OFFICE 2,545,523

PASSENGER VEHICLE

Raymond G. F. Loewy, Sands Point, N. Y., assignor to The Pennsylvania Railroad Company, Philadelphia, Pa., a corporation of Pennsylvania Application September 28, 1946, Serial No. 700,031

8 Claims. (Cl. 105—315)

This invention relates to passenger vehicles. More specifically, it has reference to railway passenger cars of a type intended for through travel service over relatively long distances.

Amongst the objects of my invention are to afford in connection with vehicles of the kind referred to, greater privacy and comfort to the passengers; improved facilities for ready conversion from daytime to night-time use and vice-versa, without requiring the services of a porter or other attendant; and to provide improved individual toilet facilities and out-of-the-way storage space for baggage and other personal belongings of the passengers.

The foregoing objectives I attain in practice as hereinafter more fully disclosed, through subdivision of the vehicles interiors into multiple compartments which are serially arranged in alternating upper and lower pairs and which are individually accessible from a lengthwise corridor, each such compartment being of full standing height and containing a permanent transversely-extending seat at one end thereof. Each upper compartment has an alcove in one end wall or partition by which it is separated from a contiguous lower compartment for storage normally of a bed mattress, and a closure panel for said alcove capable of being swung down to horizontal position to support the mattress along the window wall of the compartment. The alcove is offset at the top and bottom with resultant provision in the upper compartment, of transverse recesses respectively for baggage and for reception of one end of the mattress, and in the contiguous lower compartment, of a transverse baggage shelf above the seat therein. Each lower compartment moreover is provided with a bed which is normally stored horizontally in a hollow beneath the floor of the adjacent upper compartment, and which can be slid into usable position along the outer or window wall of such lower compartment.

Other objects with attendant advantages will appear from the following detailed description of the attached drawings, wherein Fig. 1 is a diagrammatic view in longitudinal section, of a railway passenger car conveniently embodying my invention.

Figs. 2 and 3, considered together, show on a larger scale, a section of the car taken as indicated by the angled arrows II—III in Fig. 1.

Fig. 4 is a fragmentary view in longitudinal section drawn to still larger scale and taken as indicated by the angled arrows IV—IV in Fig. 2.

Fig. 5 is a fragmentary staggered horizontal section taken as indicated by the angled arrows V—V in Fig. 4.

Fig. 8 is a view like Fig. 1 showing an alternative embodiment, the section being taken as indicated by the angled arrows VIII—VIII in Figs. 9 and 10; and Figs. 9 and 10, considered together, show a horizontal section taken as indicated by the angled arrows IX—X in Fig. 8.

Figure 6:
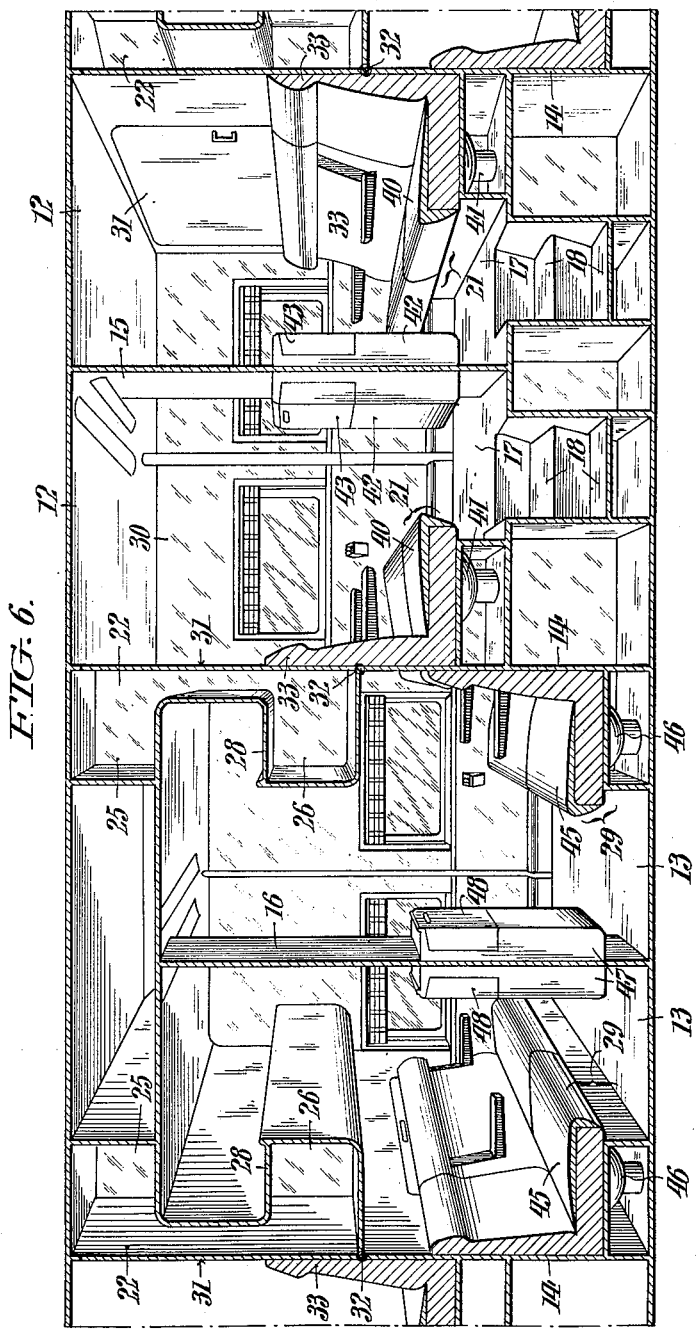
Fig. 6 is a fragmentary sectional view generally like Fig. 4 but partly in perspective showing the appointments of the several compartments in greater detail, with the car arranged for daytime use.

With more detailed reference first more particularly to Figs. 1 to 7, it will be observed that the railway car of my invention therein illustrated has a lengthwise-extending central corridor 10 set apart by spaced parallel partitions 11, and a series of alternatingly-arranged pairs of upper and lower compartments 12 and 13 along each side wall which are separated from each other by main crosswise partitions 14. The upper compartments 12 of each pair are in turn separated by intermediate crosswise partitions 15, and the lower compartments 13 of each pair by intermediate crosswise partitions 16. The floors of the lower compartments 13 are at the level of the corridor floor; while the floors 17 of the upper compartments 12 are elevated and individually approached by steps 18 leading from the corridor 10 as shown in Figs. 2, 3, 5 and 6. Each upper compartment 12 is accessible from the corridor and by way of a sliding door 19, and each lower compartment 13 by a similar sliding door 20.

Disposed in each upper compartment 12, at a main partition 14, is a built-in seat 21 and above said seat in said partition is an alcove 22 for storage normally of a bed mattress 23. Each alcove 22 is offset as at 25 and 26 to respectively provide, for the corresponding upper compartment, a top recess for baggage and a bottom recess for reception of one end of the bed mattress 23 as best shown in Fig. 4, and, in contiguous lower compartment 13, a baggage shelf 28 above a seat 29 in the latter compartment at said main partition. Adjacent the portion of the window wall 30 of the car in each upper compartment 12, the main transverse partition 14 is provided with a downwardly swingable panel 31 which serves as a closure for the alcove 22, and which can be swung down to support the mattress 23 in horizontal position along the window wall 30 as shown in Fig. 7, said panel being hinged at its lower edge as diagrammatically indicated at 32 in Fig. 4, and the back 33 of seat 21 is likewise swingable downwardly to permit this as indicated in dot-and-dash lines in said figure.

Figure 7:
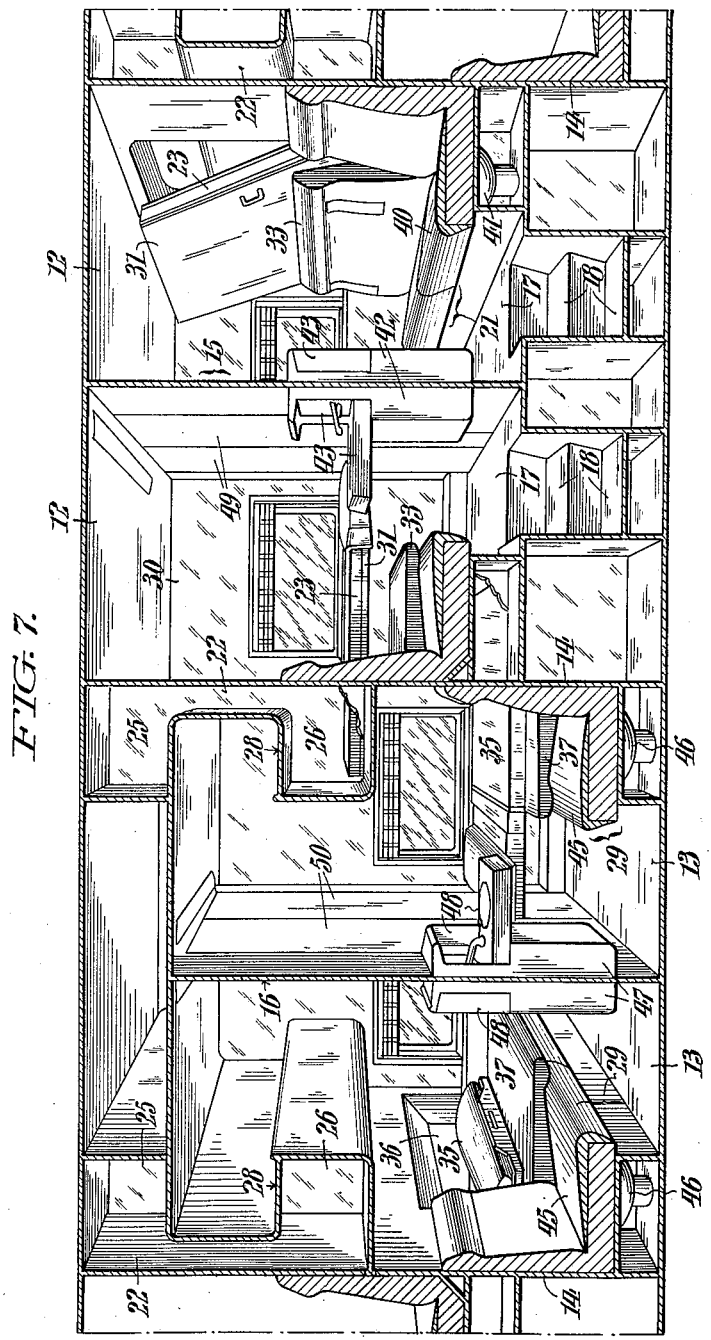
Fig. 7 is a view in turn like Fig. 6 with certain of the compartments arranged for night-time use.

For each lower compartment 13 there is provided a bed 35 which is normally stored in horizontal position in a hollow 36 beneath the floor of the contiguous upper compartment 12, said bed being slidable into said lower compartment and positioned therein along the window wall 39 thereof, as shown in Fig. 7, upon swinging down the back 37 of the seat 29, the latter being secured to a closure panel 38 in the nether portion of the partition which is downwardly swingable about a hinge 39 as diagrammatically indicated in Fig. 4.

Located in an inner corner of each upper compartment 12, beneath a retractable section 40 of the seat 21, is a toilet hopper 41, and in the opposite inner corner, a cabinet 42 with a swing-down wash basin 43 (Figs. 5, 6 and 7).

Each lower compartment 13 is similarly provided, in an inner corner beneath a movable section 45 of its seat 29, with a toilet hopper 46, and in the opposite inner corner with a cabinet 47 containing a lowerable wash basin 48.

In order that adjacent upper and lower compartments 12 and 13 may be made communicative if desired and as shown in Fig. 6, the intermediate partitions 15 and 16 are respectively constructed with retractable or removable panel sections 49 and 50 which are shown in place in Figs. 5 and 7.

In one of the front corners of the car (Fig. 3), there is a toilet room 51 for the general use of the passengers, and in the opposite front corner a utility closet 52 for towelling, bed sheets, etc., these like the apartments being accessible from the corridor 10. In the opposite rear corners of the car (Fig. 2) are cabinets or chambers 53 and 54 for air-conditioning equipment, with doors opening into the vestibule 55.

In the alternate embodiment of my invention illustrated in Figs. 8-10, the car has a mid section which is subdivided into serially-arranged pairs of upper and lower compartments 12a and 13a along opposite sides of a central corridor 10a, exactly like those of the first described form, the floor 56 of this mid section being depressed somewhat below the main floor 57. Set apart by suitable supplemental partitioning in the end section along opposite window walls of the modified car as shown, are two passenger master compartments 58 in pairs which are wider than those of the mid section. These master compartments 58 are accessible through individual sliding doors 59 from offset corridor portions 60 along the respectively opposite window walls, which communicate with the central corridor 10a by way of lateral passages indicated at 61. The master compartments 58 of each pair are separated by a transverse partition 62, and in their relatively remote inner corners are private toilet closets 63 which are entered through sliding doors 64, and which are fitted with individual hoppers 65 and built-in wash basins 66. The closets 67 in the adjacent inner corners of the master compartments 58 are designed for the reception of the wearing apparel for the occupants as well as of baggage. Each master compartment 58 is moreover equipped with a permanent transverse seat 68 in the space between the window wall of the car and the toilet closet 63, and also with two beds 69 and 73. The bed 69 is normally stored on edge lengthwise along said window wall and can be moved into horizontal position as shown in dot-and-dash lines in Figs. 9 and 10 when its use is required. The second bed 73, see Fig. 8, is normally stored longitudinally of the car flat against the ceiling of the master compartment adjacent the window wall of the car. When lowered to sleeping position, this second bed will be directly above the bed 69 in extended position. In addition, each master compartment is furnished with a chair 70 which can be moved about at will, and which can be placed as shown in the drawings to make room for the bed at night. In this instance, the public toilet 51a is located in one of the rear end corners of the car with a cabinet or chamber 53a for air conditioning equipment, the opposite corner being occupied by a utility closet 71. In one corner at the front end of the car is another utility closet 52a like the utility closet 52 of the first described form. The modified arrangement, it will be noted, also affords space for additional utility closets 72 in the passages 61.

Having thus described my invention, I claim:

1. In a passenger vehicle, a longitudinally-extending central corridor; a longitudinal series of subdivisions including upper and lower compartments arranged in alternating pairs at opposite sides of the corridor and individually accessible from the corridor, the floors of the lower compartments being at the level of the corridor floor and the floors of each pair of upper compartments being continuous with each other and at a higher level; built in transverse seats backed against the relatively remote end walls of the contiguous upper compartments of each pair; bed mattress storage alcoves in said walls above said seats, each alcove having horizontal offsets at the top and bottom providing in each upper compartment a transverse bottom recess for the reception of a corresponding end portion of the mattress and a transverse baggage shelf in the immediately adjacent lower compartment; and built-in transverse seats backed along the relatively remote end walls of the contiguous lower compartments of each pair below the baggage shelves therein.

2. A passenger vehicle according to claim 1, further including beds normally stored, in overlapping relation, in separately accessible recesses below the common floor of each pair of upper compartments and withdrawable horizontally into the respective lower compartments immediately adjacent the upper compartments of each pair of the latter.

3. A passenger vehicle according to claim 1, further including beds normally stored lengthwise of the vehicle, in overlapping relation, in separately accessible recesses below the common floor of each pair of upper compartments and withdrawable horizontally longitudinally of the vehicle into the respective lower compartments immediately adjacent the upper compartments of each pair of the latter.

4. A passenger vehicle according to claim 1, further including beds normally stored lengthwise, in overlapping relation, in separately accessible recesses below the common floor of each pair of upper compartments and withdrawable longitudinally of the vehicle into the respective lower compartments immediately adjacent the upper compartments of each pair; and downwardly-swingable backs on the seats in the lower compartments normally closing the access ends of the bed recesses.

5. A passenger vehicle having a corridor centrally of its length; a longitudinal series of subdivisions including upper and lower compartments each of one bed length arranged in alternating pairs at opposite sides of the corridor and individually accessible through separate doors therefrom, the floors of the lower compartments being at the level of the corridor floor and the floors of the pairs of upper compartments being continuous with each other at a higher level and approached by steps from the corridor; transverse seats backed against the relatively remote end walls of the contiguous upper compartments of each pair and bed mattress storage alcoves in said walls above said seats adjacent the corresponding side wall of the vehicle, each alcove having horizontal offsets at the top and bottom providing in each upper compartment a transverse top recess for storage purposes and a transverse bottom recess for the corresponding end portion of the bed mattress, and in the contiguous lower compartment a transverse baggage shelf; and a panel closure for each alcove arranged to be swung downward to support the mattress in horizontal position longitudinally of the corresponding upper compartment at said vehicle wall.

6. A passenger vehicle according to claim 5, further including beds normally stored, in overlapping relation, in separately accessible recesses below the common floor of each pair of upper compartments and withdrawable horizontally into the respective lower compartments immediately adjacent the upper compartments of each pair of the latter.

7. A passenger vehicle according to claim 5, further including beds normally stored lengthwise of the vehicle, in overlapping relation, in separately accessible recesses below the common floor of each pair of upper compartments and withdrawable horizontally longitudinally of the vehicle into the respective lower compartments immediately adjacent the upper compartments of each pair of the latter.

8. A passenger vehicle according to claim 5, further including beds normally stored, in overlapping relation, in separately accessible recesses below the floor of each pair of upper compartments and withdrawable horizontally into the respective lower compartments immediately adjacent the upper compartments of each pair of the latter; and downwardly-swingable backs on the seats in the lower compartments normally closing the access ends of the horizontal bed recesses.

RAYMOND G. F. LOEWY.

REFERENCES CITED

The following references are of record in the file of this patent:

UNITED STATES PATENTS

| Number | Name | Date |
| --- | --- | --- |
| 2,000,549 | Woodward | May 7, 1935 |
| 2,364,595 | Tully et al. | Dec. 5, 1944 |